Sept. 24, 1968  R. L. SCHULTZ  3,402,884
OPERATING MEANS FOR FUNCTION CONTROL KEYS IN
CALCULATING MACHINES AND THE LIKE
Filed June 7, 1966  8 Sheets-Sheet 1

Fig. 1.

Inventor:
Ralph L. Schultz
By
Shadolph, Love, Rogers & Van Oliver
Attys

Fig. 8.

Inventor:
Ralph L. Schultz
By
Gradolph, Love, Rogers & Vandiver
Att'ys

United States Patent Office 3,402,884
Patented Sept. 24, 1968

3,402,884
OPERATING MEANS FOR FUNCTION CONTROL KEYS IN CALCULATING MACHINES AND THE LIKE
Ralph L. Schultz, Chicago, Ill., assignor to Victor Comptometer Corporation, Chicago, Ill., a corporation of Illinois
Filed June 7, 1966, Ser. No. 555,834
14 Claims. (Cl. 235—60)

The present invention relates to improvements in keyboards of adding and calculating machines and the like, and in particular to the novel means for power operating the mechanism triggered by the function control keys of such machines.

This invention is an improvement over that shown in Patent No. 3,186,640, dated June 1, 1965, issued to Ralph L. Schultz, and entitled "Control Mechanism for Calculating Machines." This patent discloses an adding and calculating machine having function control keys designated "nonadd," "subtract," "add-total," and "add-subtotal," which when operated cause the machine to cycle through the appropriate function depending upon which key is pressed, and in the case of the add-total and add-subtotal keys, whether an amount is to be added into the machine as entered on the keyboard through the numeral keys, or whether a total or subtotal is to be taken.

In the patented machine the operator, when depressing the key, must use sufficient force to operate linkage to close the motor switch to cycle the machine, and also to operate other linkage to latch the keys in depressed position and to set the machine for the functions of non-adding, subtracting, adding, subtotaling, or totaling as the case may be. This dual linkage system incorporates substantial resistance, and depending upon the function and the amount of linkage which must be moved, the power exerted by the operator was required to be 10 to 20 ounces of force. It is noted that this pressure is highly nonuniform, and at the end of the day an operator who has had to work rather constantly with the machine will show undesirable signs of fatigue.

Another disadvantage of the previous machine was that if an operator were careless he could "pick" at the keys without depressing them fully, and thus operate the linkage to the motor switch, thus cycling the machine, but since the key did not have a full stroke it would not be latched nor would it set the linkage for performing the function indicated by the key struck.

The optimum desired in machines of this type is to make provision for operation of the machine by operators having light touch so that the maximum efficiency can be performed by the operator and obtained from the machine without the machine either malfunctioning or rendering the operator excessively tired.

It is therefore a principal object of the present invention to provide a new and improved operating means for the function control keys of adding and calculating machines which are responsive to be operated by a force substantially less than that of previously known machines, and which are more positive in their operation through a complete stroke.

Another object is to provide a new and improved operating means for such function control keys wherein the force needed to operate the nonadd, subtract, add-total, and add-subtotal keys is approximately 3½ ounces each, compared with the prior machine wherein a force of up to 20 ounces is needed.

Another object is to provide a new and improved operating means for function control keys wherein the force of operating the keys is uniform for all keys within a small fraction of an ounce.

Another object is to provide a power mechanism released by depressing a function control key a predetermined distance, which closes the motor control switch and simultaneously releases other linkage to carry out the machine function corresponding to the depressed key.

Another object is to provide a power crank for each function control key which is driven by a spring and connected by slides, levers, links, and the like, to close the motor control switch and to cause the machine to carry out the function corresponding to the key struck, and to provide an automatically resettable latch for each crank which is released by operation of the key.

Another object is to provide that the latches mentioned in the preceding paragraph latch whatever key is depressed in the depressed condition until the end of the machine cycle, at which time the latches, cranks, and keys are reset.

Other objects and advantages will become apparent from the following description taken in conjunction with the accompanying drawings, wherein.

The present invention, as noted previously, is an improvement over that disclosed in Ralph L. Schultz Patent No. 3,186,640, dated June 1, 1965, which in turn was an improvement over the invention disclosed in E. M. Lippert et al. Patent No. 2,731,206, dated Jan. 17, 1956. Reference should be made to those patents and to other patents mentioned therein and hereinafter for those portions of a ten key adding or calculating machine which are not particularly shown herein but are known in the art.

The machine comprises and includes a more or less conventional numeral keyboard having a set of ten numeral keys, which are not shown since they form no part of the present invention, and may have repeat and correction keys which similarly are not shown. It does, however, contain a set of function control keys which include a combination add-subtotal key 20, a combination add-total key 22, a subtract key 24, and a nonadd key 26.

The operating mechanism is housed in a casing which includes a bottom plate 28, exterior side walls 30, a cover, not shown, which is pivotally mounted on the casing and which has a motor switch control linkage 32 which, when the casing is open, positions the motor switch so that it may not be operated to cycle the machine. This mechanism is more clearly shown in Ralph L. Schultz Patent No. 3,186,635, dated June 1, 1965.

The casing also includes the appropriate internal side plates 34 which support the various operating mechanisms and inasmuch as such structures are well known they will not be further described. Also, the machine incorporates a ribbon and ribbon feed mechanism 36 which cooperates with the paper tape, platen, and type sectors to imprint the tape.

The machine is powered by an electric motor 38 which is driven through appropriate clutches, cams, and cranks, to cycle a main shaft 40 first in the counterclockwise direction and then in the clockwise direction an arcuate distance of slightly less than 100° for a complete cycle. The motor 38 is under the control of a motor control switch 42 which includes a pair of normally open contacts 44 which must be closed in order to initiate the operation of the motor.

Closure of the motor control contacts 44 is under the control of a motor switch trip slide 46 which is mounted for rectilinear movement only by means of pins 48 carried thereby movable in guide slots 50 in the frame plate 34. The slide is biased rearwardly of the machine by a spring 52 connected to a hook 54 on the slide and a stud 56 in the frame. The slide 46 has a downwardly and rearwardly extending generally L-shaped arm 58 formed integrally therewith and which is adapted to perform a number of functions. This arm is formed with a slot 60 which is guided on a fixed shaft 62 further to guide the slide 46 in a rectilinear manner and to steady the L-shaped arm portion thereof.

As will be described hereinafter, when any one of the function control keys 20, 22, 24, 26, is actuated, the slide 46 is moved forwardly in the machine against the biasing effect of the spring 52. As it does so, a projection 64 depending from the lower edge of the L-shaped arm 58 moves forwardly and away from stud 66 projecting inwardly from arm 68 pivotally mounted on shaft 70. The forward edge of the projection 64 contacts a stud 72 carried by a depending finger 74 of an arm 76 pivotally mounted on the shaft 62. The arm 76 is biased in the counterclockwise direction by a spring 78 connected to a second finger thereof and it holds a third finger 80 against the underside of a lug 82 carried at the upper end of the arm 68. The finger 80 is notched at 81 to latch the arm 68, but when arm 76 is rotated in the clockwise direction by the projection 64, the arm 68 is released and spring 84, connected to the lower end of the arm 68, pivots the latter in the counterclockwise direction about its pivot shaft or stud 70. The arm 68 is formed with a hook 86 and a biasing spring 84 holds it in engagement with a stud 88 carried on a bell crank 90 pivoted on a stud 92. At its outer end the bell crank 90 carries an insulating disc 94 which is positioned to contact and close the motor control switch contacts 44 when the bell crank 90 is pivoted in the clockwise direction by the arm 68 under the force of the spring 84. Thus, when any one of the function control keys 20, 22, 24, or 26 is depressed, the slide 46 is moved forwardly, the bell crank, through the linkage just described, is rotated in the clockwise direction so that the disc 94 closes the contacts 44 of the motor control switch 42, and the motor 38 is then energized for a single cycle of the machine.

The slide 46 is formed with four inwardly projecting forms or lugs 98, 100, 102, and 104 on its lower edge corresponding respectively to the add-subtotal key 20, the add-total key 22, the subtract key 24, and the non-add key 26.

Referring particularly to FIGS. 1, 4, 6, 7, and 9, it will be observed that the add-subtotal key 20 is mounted on a stem 106, which is guided for vertical movement only on a guide pin 108 and a pair of guide and pivot pins 109 and 110. The key 20 is biased upwardly to normal position by a spring 112 and carries a pin 114 by means of which it may be latched in depressed position until near the end of the machine cycle, when it is released for return to normal position by the spring 112.

Figure 5:
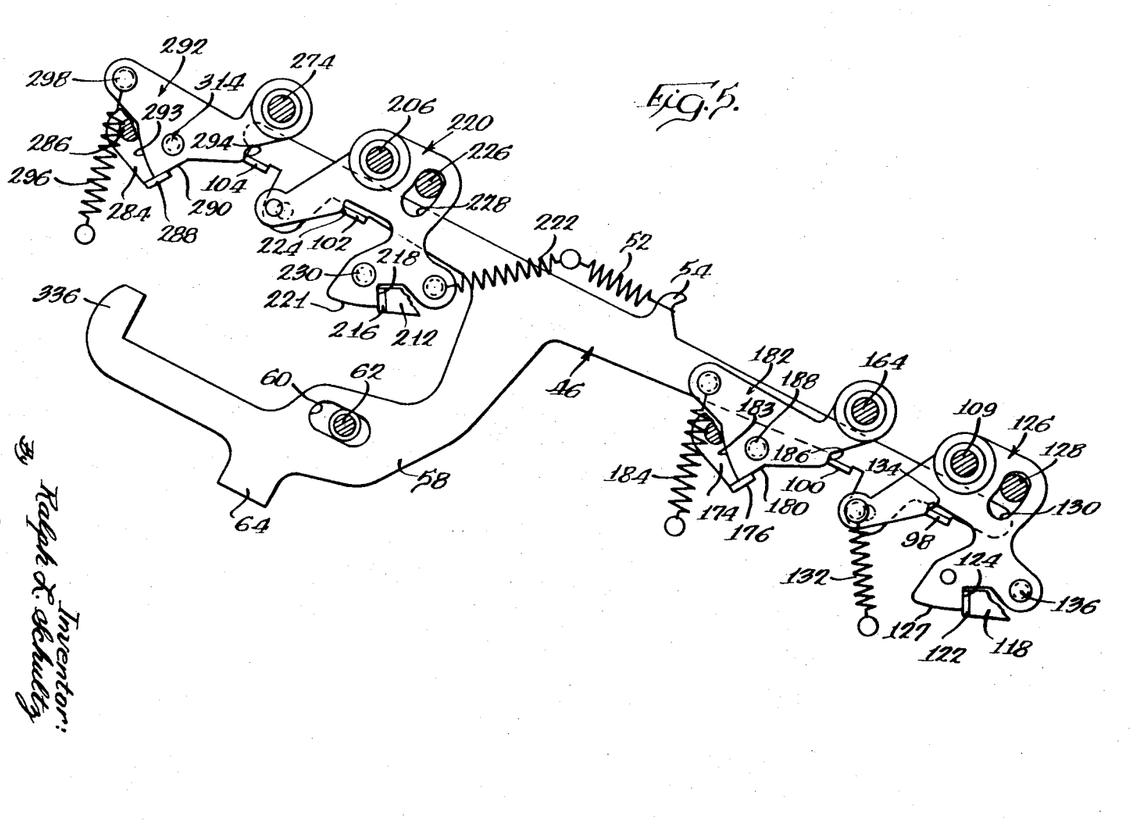
FIG. 5 is an elevational view on an enlarged scale of the motor switch trip slide and the power cranks to operate the same, looking outwardly of the machine from the left side of the slide.
Figure 6:
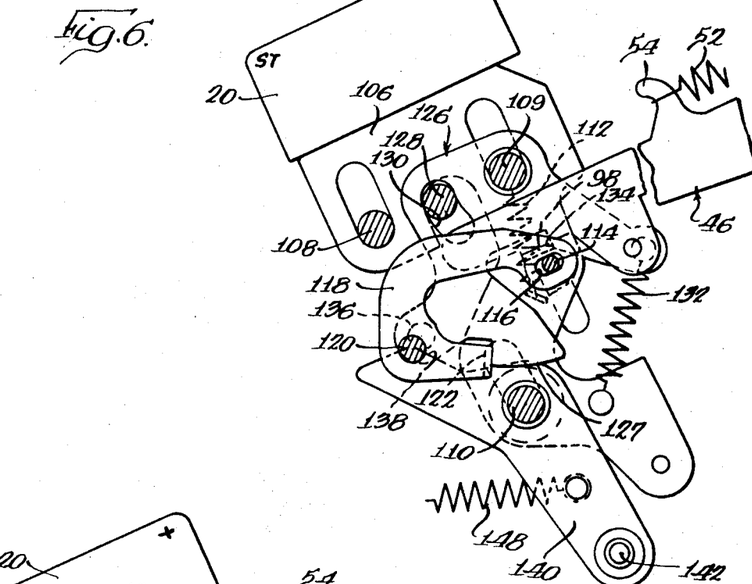
FIG. 6 is an elevational view on an enlarged scale of the add-subtotal key in normal position, showing the relation of the key, the motor switch trip slide, the power crank therefor, the power crank latch, and the control arm.
Figure 7:
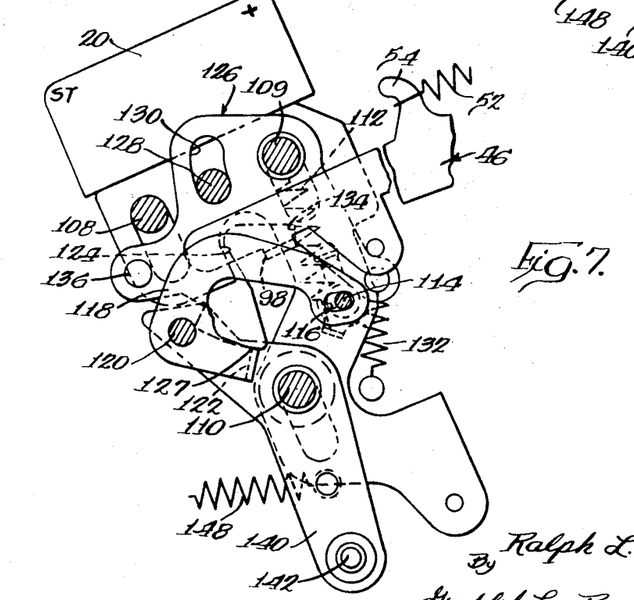
FIG. 7 is an elevational view similar to FIG. 6, showing the add-subtotal key depressed and the other parts in operated position.
Figure 8:
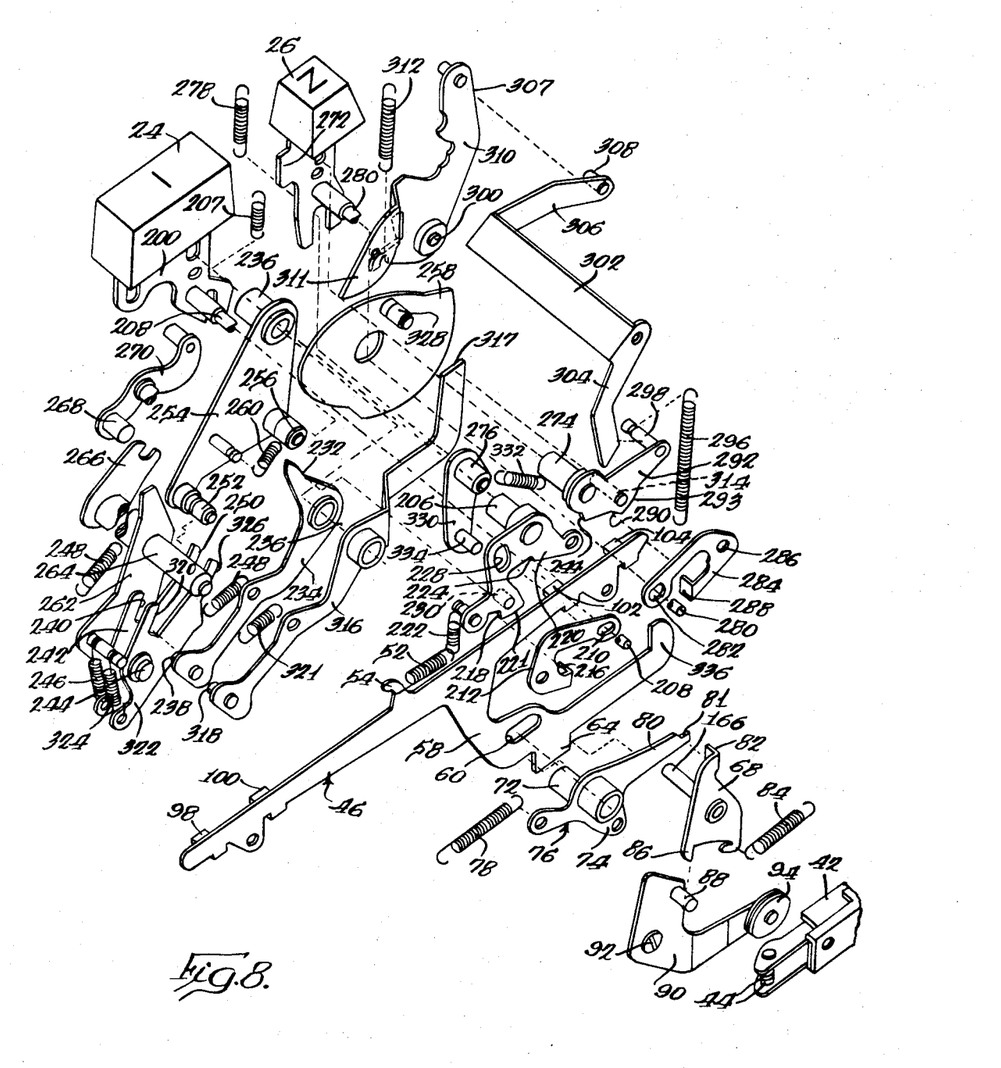
FIG. 8 is an exploded perspective view of the nonadd and subtract keys and the linkages operated thereby, which are shown in FIGS. 1, 2, and 3.
Figure 9:
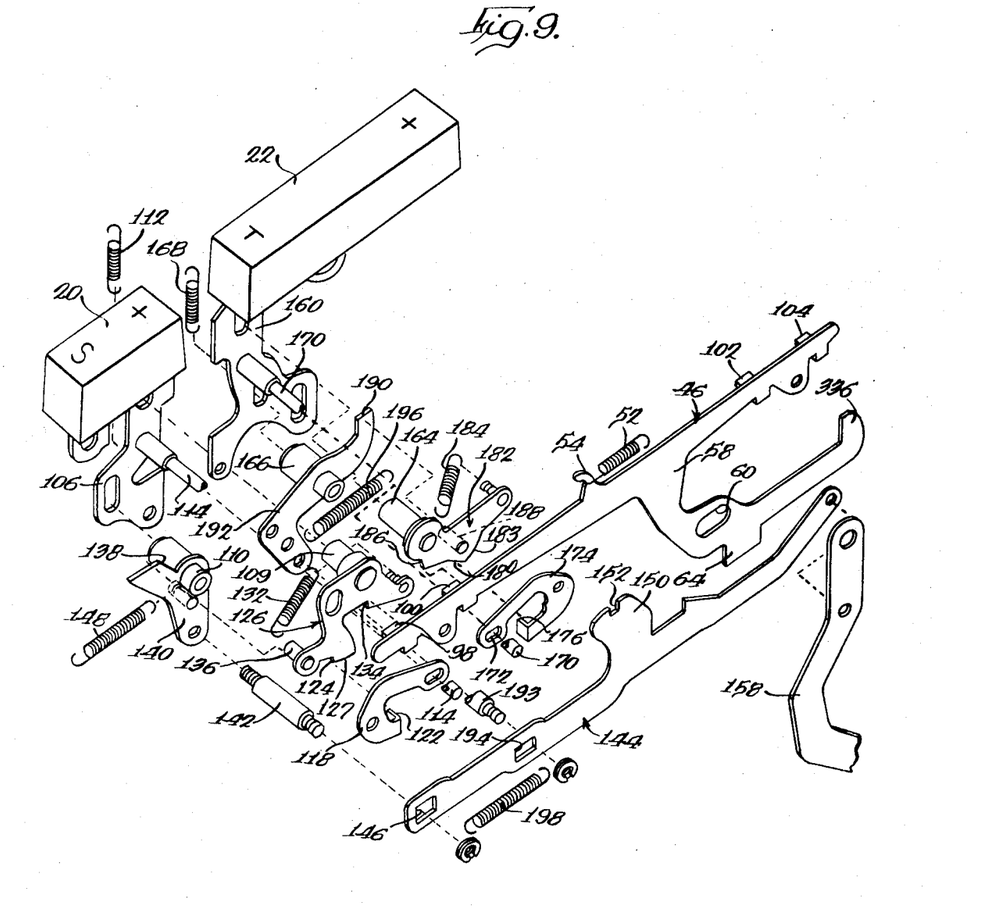
FIG. 9 is an exploded perspective view of the add-total and add-subtotal keys and the linkages operated thereby, which are shown in FIGS. 1, 4, 6, and 7.

The latch pin 114 extends through a slot 116 in one end of a hook-shaped power crank latch 118 pivotally mounted on a fixed pivot 120. At its opposite end the latch 118 is formed with an inwardly turned ear or lug 122 which engages a shoulder 124 on power crank 126. The power crank 126 is pivotally mounted on the guide and pivot pin 109 and its pivotal movement is limited by a pin 128 which extends through a slot 130 in the crank. Opposite the shoulder 134 the power crank 126 is connected to a drive spring 132. The biasing spring 52 for the motor switch trip slide holds the lug 98 snugly against a nose 134 formed on the power crank 126. When the key 20 is depressed the latch pin 114 rotates the latch 118 to remove the ear 122 from its latching position against the shoulder 124 and the drive spring 132 rotates the power crank 126 in the counterclockwise direction (FIG. 5) so that its nose, bearing against the lug 98, drives the motor trip switch slide 46 forwardly to operate the linkage previously described so that the motor switch contacts 44 are closed and the motor 38 energized to drive the machine through either an add or a subtotal cycle according to the condition of the machine. The spring 112 tends to restore the key 20 but its action is restrained by engagement of the latch lug 122 against arcuate edge 127 of the power crank 126, and thus the lug 20 is latched in depressed position until the end of the machine cycle.

The power crank 126 has an inwardly projecting pin 136 engageable with an edge 138 of a bell crank 140 pivotally mounted on the pivot and guide pin 110. The lower end of the bell crank 140 is connected by a pin 142 to one end of an automatic total slide 144, the connection being made through a slot 146 in the forward end of the slide 144. The bell crank 140 is biased for pivotal movement in the clockwise direction (FIGS. 6 and 7) by a spring 148, and when the power crank 126 is pivoted in the clockwise direction the pin 136 is removed from the edge 138 of the bell crank and the spring 148 rocks it in the clockwise direction to urge the automatic total slide 144 forwardly.

Figure 1:
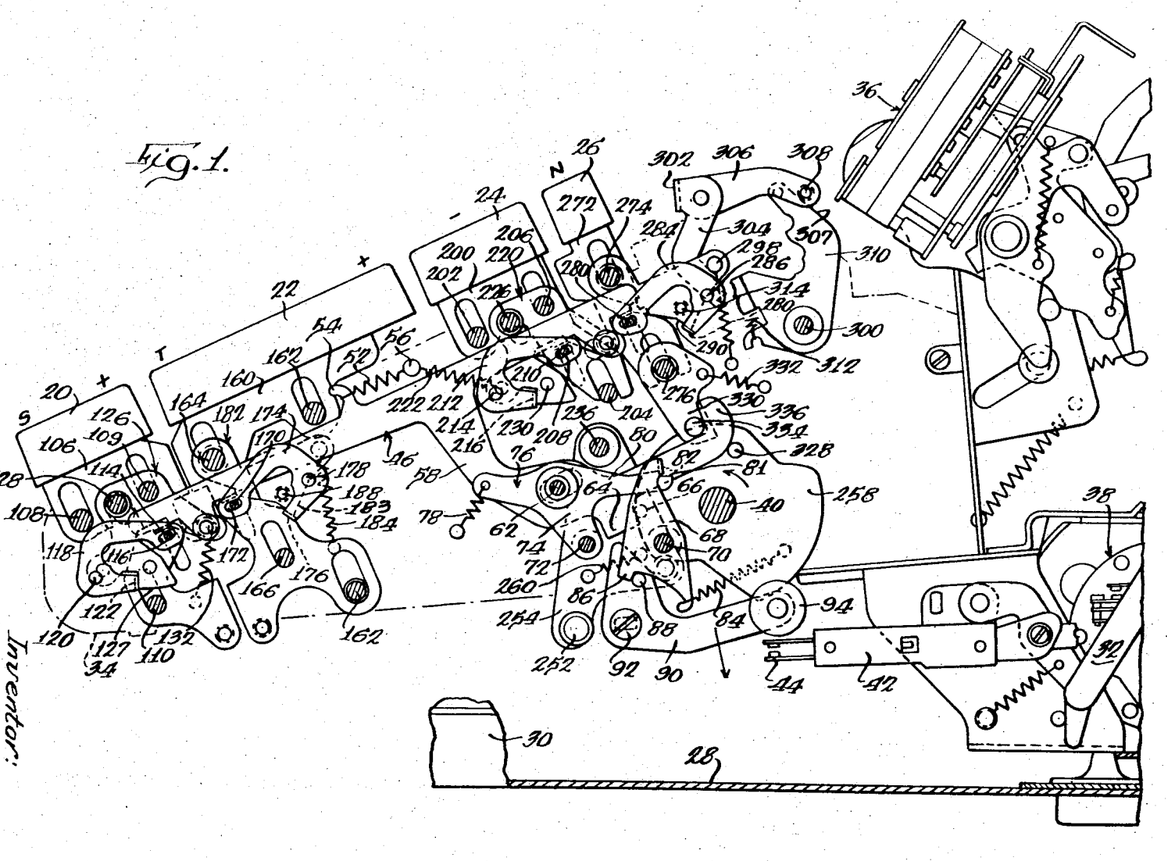
FIG. 1 is a side elevational view, looking inwardly from the right side of a ten key adding or calculating machine, showing the function control keys and a portion of the linkage operated thereby.
Figure 2:
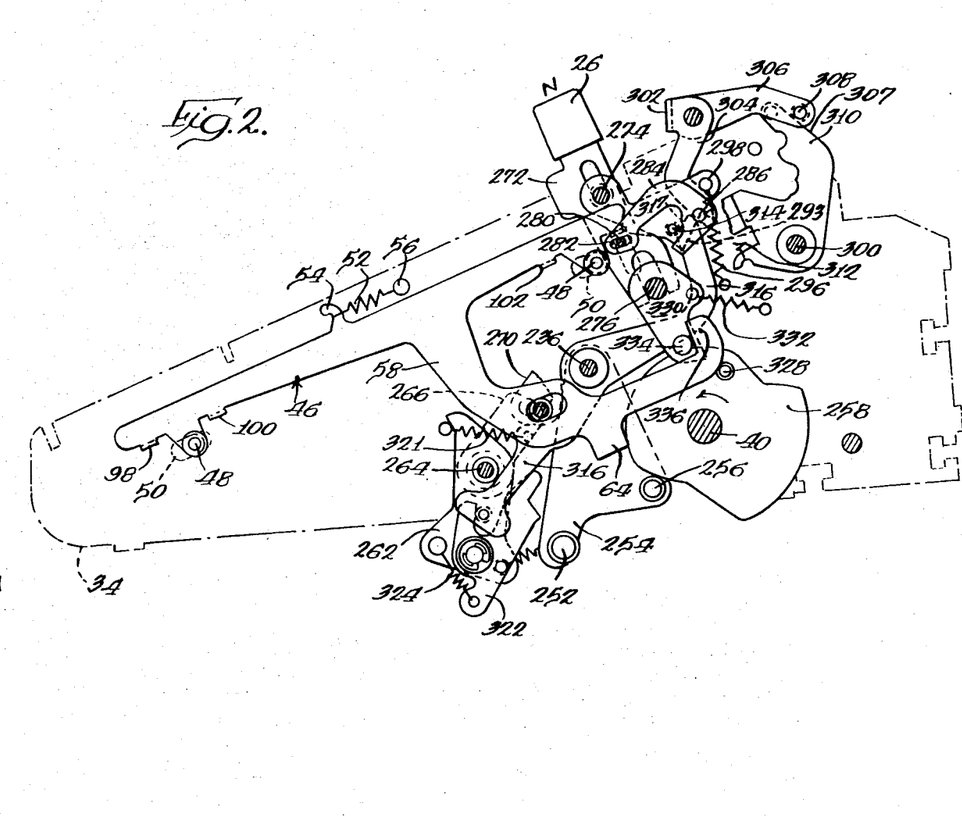
FIG. 2 is a fragmentary side elevational view, similar to FIG. 1, showing the nonadd key and the linkage operated thereby to set the type sector bearing the function indicia and to initiate operation of the linkage for controlling a nonadd machine cycle.
Figure 3:
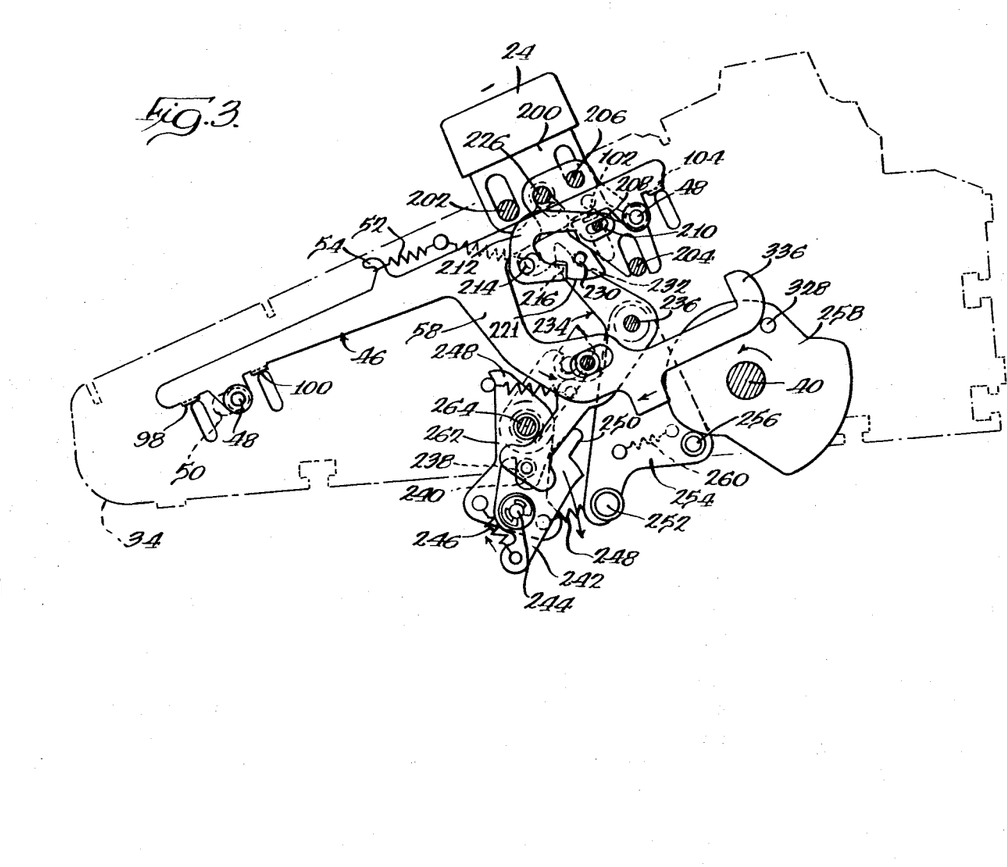
FIG. 3 is a fragmentary side elevational view similar to FIG. 1, showing the subtract key and the linkage operated thereby to set the type sector bearing the function indicia.
Figure 4:
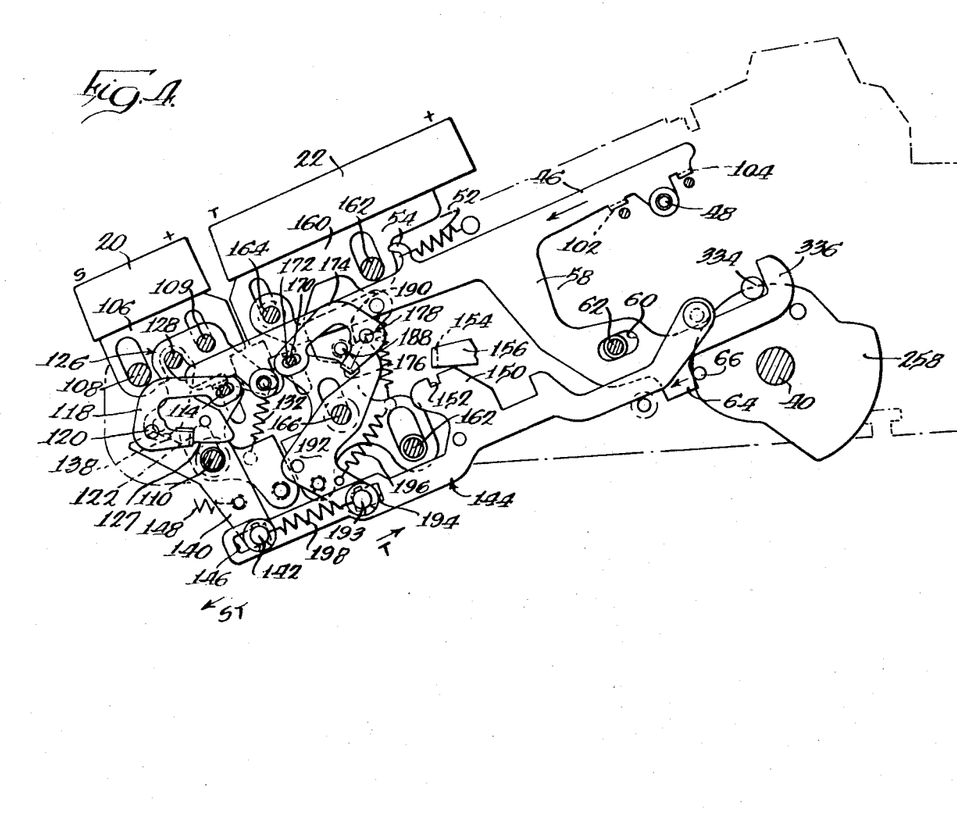
FIG. 4 is a fragmentary side elevational view similar to FIG. 1, showing the add-total key and the add-subtotal key and the linkages operated thereby to operate the automatic total slide.

The slide 144 has an upwardly extending portion 150 formed with a notch 152 in its upper edge. The notch is engageable by a lug 154 carried on the end of a lever 156 (FIG. 4). When an amount is set up on the keyboard to be entered into the accumulator, the lever is actuated to engage the lug 154 in the notch 152 and thus when the key 20 is depressed the bell crank 140 and spring 148 are not able to drive the slide 144 forwardly and the machine is operated then to set the amount indicated by the depressed keys from the keyboard into the accumulator.

At its rear end the slide 144 is pivotally connected to a link 158 between its ends, which in turn is connected through other suitable linkage to the subtotal-total control shaft (not shown) in the manner shown in the aforementioned Patent No. 3,186,640. Thus, when it is desired to take a subtotal and no amount is set up on the keyboard, the key 20 is depressed, the bell crank 140 is pivoted in the clockwise direction under the force of the spring 148, the slide 144 is moved forwardly, and the machine is cycled to extract from the accumulator a subtotal of the amounts previously entered thereinto, to print the sub-total on the tape, and then to restore this amount into the accumulator during the second half of the machine cycle in a manner known in this art.

The add-total key 22 is mounted on a stem 160 which is guided for reciprocable vertical movement on guide pin 162 and combination guide and pivot pins 164 and 166. It is biased in the upward direction by a restoring spring 168. The stem 160 carries a latching pin 170 similar to the pin 114, which is engaged in a slot 172 and one end of a hook-shaped latch 174 which has a lug 176 at its opposite end and is mounted on a fixed pivot 178. The lug 176 engages a shoulder 180 on a power crank 182 which is pivotally mounted on the guide and pivot pin 164. The power crank 182 is biased for rotation in the counterclockwise direction (FIG. 5) about the pivot pin 164 by a drive spring 184 and has a nose 186 against which the lug 100 on the motor switch control slide 46 is held by the biasing spring 52. Depression of the key 22, therefore, will drive the latch pin 170 downwardly and will pivot the latch 174 in such fashion as to remove its lug 176 from the shoulder 180, and under the action of key restraining spring 168 engage it with arcuate edge 183 to latch the key 22 in depressed position, thereby permitting the drive spring 184 to rotate the power crank 182 in the counterclockwise direction, driving the slide 46 forwardly and operating the linkage to close the contacts 44 of the motor switch 42 to operate the motor 38 to cycle the machine through one cycle of operation, whether it is adding or total taking.

The power crank 182 carries an inwardly projecting blocking pin 188 adapted to engage the upper end edge 190 of a bell crank lever 192 pivotally mounted on the combination pivot and guide pin 166. At its opposite and lower end the bell crank lever 192 is connected by a pin 193 and slot 194 to the automatic total slide 144. The bell crank lever is biased in the counterclockwise direction (FIG. 4) by a spring 196 and when the power crank 182 is rotated in the clockwise direction the blocking pin 188 is moved away from the edge 190 and the spring 196 may then rotate the bell crank lever in the counterclockwise direction, driving the connecting pin 193 and the automatic total slide 144 rearwardly, to set the total-sub-total shaft for the purpose of taking a total and clearing the accumulator in a manner known in this art. The pins 142 and 193 are interconnected by a spring 198 to urge them against the adjacent ends of the respective slots 146 and 194, and therefore to control the lost motion in operating the slide 144. The lever 156 controlled by the setting of the pin carriage cooperates in conjunction with the actuation of the add-total key 22 in the same manner as was described with respect to the add-subtotal key 20.

The subtract key 24 and its operating linkages are best seen in FIGS. 1, 3, 5, and 8. The key 24 has a stem 200 which is mounted for vertical rectilinear movement on guide pins 202 and 204 and guide and pivot pin 206. The stem 200 has a latch pin 208 engaged in a slot 210 of a hook-shaped latch 212 pivoted at 214 so that when the stem 200 is depressed by operation of key 24 latch 212 will be pivoted in the clockwise direction. The latch 212 has a lug 216 engageable with a shoulder 218 on a power crank 220 pivotally mounted on the combination pivot and guide pin 206. The lug 216 will engage arcuate edge 221 on the power crank to latch the key 24 in depressed position until the end of the machine cycle.

When the latch 212 is operated by depressing the key 24, the power crank 220 is rotated in the counterclockwise direction (FIG. 5) by a power spring 222. A nose 224 on the power crank 220 is held in engagement with the lug 102 on the motor switch control slide 46 by the latter's biasing spring 52, and when the power crank is rotated in the counterclockwise direction the slide 46 is driven forwardly in the machine. The movement of the crank is limited by a pin 226 engageable in a slot 228 in the power crank.

The power crank 220 carries a pin 230 which engages edge 232 of the upper arm of a bell crank 234 pivotally mounted on a shaft 236. The lower end of the bell crank carries a pin 238 which engages in a notch 240 of an arm 242 pivotally mounted at 244. The arm is biased in the clockwise direction (FIG. 3) by a spring 246 and the bell crank 234 is similarly biased in a clockwise direction by a spring 248 so that its upper arm is held against the pin 230 and the pin 238 at its lower end is in constant engagement in the notch 240 of the arm 242. This arrangement insures a positive driving connection between the power crank 220 and the arm 242 under the influence of the drive spring 222.

The outer end of the arm 242 is formed with a notch 250 which is adapted to engage the larger diameter portion of a stud 252 carried at the lower end of a large plate-like lever 254 which is pivotally mounted on the pivot pin 236. The lever also carries a roller 256 which engages the periphery of a plate cam 258 fixed on the main shaft 40. The roller 256 is held against the periphery of the plate cam 258 by a spring 260. The pivot 244 is carried at the lower end of an arm 262 pivotally mounted at 264. Also fixed to the pivot 264 is a short upwardly and rearwardly extending arm 266 having a forked end engageable with a pin 268 on a pivotally mounted link 270 which is connected to other linkage which sets the printing segment which prints a symbol on the tape for the function being taken at the time, such as total, subtotal, subtract, and nonadd. In this case the sector would be rotated sufficiently so that when the amount is entered into the machine on depressing the key 44 for a subtract function, the subtract sign or bar would appear in the right-hand margin of the tape adjacent the amount which is being subtracted from the amount previously entered into the accumulator. Actuation of the subtract key 24 also operates other linkage not shown but known in this art, to subtract the amount set up in the keyboard from the amount stored in the accumulator.

The nonadd key 26, as best shown in FIGS. 1, 2, 5, and 8, is mounted on a stem 272 and is guided for vertical movement on guide and pivot pins 274 and 276. The key is biased upwardly by a spring 278. The stem 272 carries a latching pin 280 which projects through a slot 282 in one end of a hook-shaped latch 284 pivotally mounted at 286. The latch is formed with a lug 288 which engages a shoulder 290 on a power crank 292 which is pivotally mounted on the pin 274. The power crank 292 is formed with a nose 294 aganst which the form or lug 104 on the motor switch trip slide 46 is held by the spring 52. The power crank 292 is biased in the counterclockwise direction (FIG. 5) by a spring 296 connected to a pin 298 extending inwardly from the crank. When the key 26 is depressed and the lug 288 disengaged from the shoulder 290, the lug 288 engages arcuate edge 293 of the power crank 292 to retain the key in depressed position until the end of the machine cycle. When the latch 284 releases the power crank the spring drives it in the counterclockwise direction and the nose 294 drives the slide 46 forwardly in the machine to operate the linkage which closes the contacts 44 of the motor switch 42, for the purpose of operating the machine through a single cycle.

The nonadd linkage includes a pivotally mounted bail 302 which has a first arm 304 engaged with the pin 298 and a second arm 306 positoned inwardly of the function key mechanisms and which carries a pin 308 at its outer end. The pin 308 is engaged with the upper rear edge 307 of a nonadd rocker plate 310 pivotally mounted on stud 300 and biased in the clockwise direction by a spring 312 which also keeps the arm 304 against the pin 298. The plate 310 has a downwardly and forwardly projecting portion 311 which is adapted, when the plate 310 has been pivoted by the spring 312 upon release of the arm 304 by the pin 298, to block the movement of the mechanism which engages the accumulator, and thus the amount which is printed on the tape is not entered into the accumulator for purposes of computation.

The crank 292 carries a second pin 314 which projects inwardly to be engaged by edge 317 of the upper end of a lever 316 pivotally mounted at about its midpoint on the pin 236, and which at its opposite end carries a pin 318 engageable in a notch 320 on an arm 322 similar to the arm 242, and mounted on the pivot 244. The arm 322 is biased in the clockwise or downward direction by a spring 324, and at its outer end is notched at 326, which notch is adapted to engage the smaller diameter portion of the stud 252 carried on the plate lever 254. This arm therefore permits a pivotal movement of the lever 262 and its pivot 264 somewhat less in the clockwise direction (FIGS. 2 and 3) than when the arm 242 engages stud 252. Thus, it sets the type sector carrying indicia to a different position and one wherein the nonadd function character is printed on the tape at the right side. This nonadd function character is the letter "N" and it indicates that a number has been entered into the keyboard and has been printed on the tape, but has not been entered into the accumulator and does not affect the calculation which the machine is performing.

The motor switch trip slide 46 is normally operated in the forward direction by the operated power crank when released by their respective latches. It is reset by the plate cam 258 which carries a roller 328, which engages a wipe pawl 330 pivotally mounted on the combination guide and pivot pin 276. The wipe pawl 330 is held in neutral position by a spring 332 and carries an outwardly projecting pin 334 which engages hooked forward end 336 of the L-shaped rearwardly projecting arm 58 of the slide 46. On the first half of the machine cycle the roller 328 wipes past the pawl 330, rotating it slightly in the clockwise direction. However, on the second half of the machine cycle when the main shaft 40 and cam 258 are driving in the clockwise direction, and the slide 46 has been moved to its forward position by one of the power cranks, the end of the pawl 330 lies in the path of the roller 328 and adjacent the end of the machine cycle the roller engages the pawl 330, rotating it in the counterclockwise direction, and the pin 334 engaging the hooked end 336 of the slide 46 drives its rearwardly to reset whichever crank has been operated, and to engage it with its respective hook-shaped latch, thereby conditioning the machine for a subsequent operating cycle. The cranks also reset the function linkages which have been described for the carrying out of a subsequent normal function.

Each of the function control keys 20, 22, 24, and 26 carries on its stem a latching pin 114, 170, 208, and 280, respectively. These pins not only release the latches for the appropriate power cranks, but they also set an interlock to prevent operation of more than one function key at a time and to prevent operation of a number key when a function key is depressed, as more fully shown and described in the aforementioned Patent No. 3,186,-640. The latching pins also retain the operated key in depressed condition until it is released near the end of the machine cycle. It should be noted that the arcuate edges 127, 183, 221, and 293 engaged by the latch lugs are formed on radii with their centers on the pivots of their respective power cranks, and thus during resetting of the operated crank at the end of the machine cycle this engagement of the lug and arcuate surface offers a minimum amount of resistance.

From the foregoing description it is clear that the depression or operation of any of the function control keys 20, 22, 24 and 26 does three things in so far as this invention is concerned. This operation releases the hook-shaped latch from the respective power crank to permit the driving spring for the crank to operate the linkage which closes the motor switch contacts 44. The operated hook-shaped latch in coaction with its released crank holds the depressed key in that position until the end of the machine cycle. With respect to the subtract and nonadd keys 24 and 26, the power crank also operates other linkages to set the type sector to print the proper symbol on the tape and for the purpose of setting the machine for carrying out the function of subtracting an amount from the accumulator or for setting the linkage so that no arithmetic function is performed in the machine, but an amount is printed on the tape with the appropriate cycle.

In the cases of the add-subtotal and add-total keys 20 and 22, the released power cranks release the linkages for taking a subtotal or total if no amount is set up in the keyboard.

To these functions is added that of setting the function key interlock. However, this does not require moving a substantial linkage train, and the required operating force is not great. The force which is exerted by the operator in pressing the keys is, therefore, appreciably less than in those machines where the operator himself must use sufficient force to drive the linkage to close the motor switch 44 and to drive other linkages which have been described, and which condition the machine for carrying out the function under the appropriate built-in power portions. It is possible, with the arrangement of this invention, to lessen the amount of force used by the operator and to make this force uniform for all function control keys so that the operator's fatigue is considerably lessened. As stated previously, the uniform pressure amounts to about 3½ ounces. In previous machines the amount would be nonuniform, and depending upon the amount of linkages which the operator was forced to move and set by operation of the key, the force required could be as much as 20 ounces.

It is thus seen that the objectives which are claimed for this invention at the outset of this description are fully attained by the mechanisms which have been described.

While a preferred embodiment of the invention has been shown and described, it will be apparent that numerous modifications and variations thereof may be made therein without departing from the underlying principles of the invention. It is therefore desired, by the following claims, to include within the scope of the invention all such variations and modifications by which substantially the results of this invention may be obtained through the use of substantially the same or equivalent means.

What is claimed as new and desired to be secured by United States Letters Patent is:

1. In a motor powered calculating machine or the like having a motor, a motor control switch, and a plurality of manually operable function control keys, the combination comprising, a longitudinally slidable motor switch trip slide, means biasing said slide in a first direction, linkage operated by said slide when moved in a second direction to operate the motor control switch to energize the motor, a pivotally mounted power crank corresponding to each function control key engageable with said slide and adapted when pivoted to move said slide in said second direction, power driving means connected to each power crank to pivot said crank in slide moving direction, a latch engageable with each power crank to restrain it against movement by said driving means, and means connecting each latch to its corresponding function control key whereby operation of one of said function control keys releases its corresponding latch from the power crank with which it is normally engaged and said driving means pivots said released crank to drive said motor control slide in the second direction to operate the motor control switch to energize the motor.

2. The combination set forth in claim 1, including means driven by the motor and engageable with said motor switch trip slide to drive said slide in said first direction and to relatch the released power crank.

3. The combination set forth in claim 1, wherein the calculating machine includes a main shaft driven from the motor, and includes means driven by the shaft and engageable with said motor switch trip slide to move said slide in said first direction to restore the driven power crank to its initial position and to reengage it with its latch near the end of a machine cycle.

4. The combination set forth in claim 3, wherein said means to move said motor switch trip slide in said first direction includes a pivotally mounted wipe pawl, a pin carried by said pawl and held in engagement with said slide, and a member mounted for rotation with the main shaft whereby said member wipes past said pawl during the first portion of a machine cycle and engages said pawl during the last portion thereof to move said pawl, said member, and said slide.

5. The combination set forth in claim 1, wherein said motor switch trip slide has a laterally projecting lug corresponding to each function control key, and each power crank has a nose adapted to be engaged by a respective one of said lugs, said slide biasing means normally holding said lugs in engagement with said noses.

6. The combination set forth in claim 1, wherein said power means connected to each power crank includes a spring.

7. The combination set forth in claim 1, wherein each power crank has a restraining shoulder and its corresponding latch has a lug normally engaging said shoulder, and spring means biasing each latch so that its lug normally engages said crank shoulder.

8. The combination set forth in claim 7, wherein said means connecting said latch to its corresponding function key comprises a laterally projecting latching pin.

9. The combination set forth in claim 8, wherein each latch is hook-shaped with the power crank engaging lug at one end and a slot at the other end in which said latching pin is engaged, and including means pivotally mounting said latch intermediate its ends.

10. The combination set forth in claim 1, including linkage normally restrained against movement by each power crank and released upon rotation of said crank to cause the machine to function in the manner required by the particular function key operated.

11. The combination set forth in claim 10, including power means connected to said linkage to drive said linkage in function direction upon release by a rotated crank.

12. The combination set forth in claim 1, wherein each power crank has an edge engageable by its restraining latch upon depression of its respective function control key to retain the depressed key in depressed condition until the end of the machine cycle.

13. The combination set forth in claim 7, wherein each power crank has an arcuate surface adjacent its restraining shoulder engaged by said latch lug upon depression of the respective function control key to retain the depressed key in depressed condition until the end of the machine cycle.

14. The combination set forth in claim 13, wherein the radius of each arcuate edge has its center on the pivotal center of the respective power crank.

References Cited

UNITED STATES PATENTS

| | | | |
|---|---|---|---|
| 3,064,892 | 11/1962 | Scozzafava et al. | 235—130 |
| 3,168,241 | 2/1965 | Toorell | 235—130 |
| 3,186,640 | 6/1965 | Schultz | 235—60 |

RICHARD B. WILKINSON, *Primary Examiner.*